US012190431B2

(12) United States Patent
Briggs

(10) Patent No.: US 12,190,431 B2
(45) Date of Patent: Jan. 7, 2025

(54) IMAGE PROCESSING SYSTEMS AND METHODS

(71) Applicant: Lifecast Incorporated, Menlo Park, CA (US)

(72) Inventor: Forrest Briggs, Palo Alto, CA (US)

(73) Assignee: Lifecast Incorporated, Menlo Park, CA (US)

( * ) Notice: Subject to any disclaimer, the term of this patent is extended or adjusted under 35 U.S.C. 154(b) by 113 days.

(21) Appl. No.: 17/961,135

(22) Filed: Oct. 6, 2022

(65) Prior Publication Data

US 2023/0106679 A1 Apr. 6, 2023

Related U.S. Application Data

(60) Provisional application No. 63/253,076, filed on Oct. 6, 2021, provisional application No. 63/253,072, filed on Oct. 6, 2021.

(51) Int. Cl.
*G06T 15/00* (2011.01)
*G06T 5/92* (2024.01)
*G06T 7/70* (2017.01)
*G06T 15/20* (2011.01)

(52) U.S. Cl.
CPC .............. *G06T 15/005* (2013.01); *G06T 5/92* (2024.01); *G06T 7/70* (2017.01); *G06T 15/205* (2013.01)

(58) Field of Classification Search
CPC ....... G06T 15/005; G06T 15/205; G06T 5/92; G06T 7/70; G06T 9/001; H04N 19/46
See application file for complete search history.

(56) References Cited

U.S. PATENT DOCUMENTS

| 10,096,122 | B1* | 10/2018 | Agrawal | G06T 7/90 |
| 2013/0120418 | A1 | 5/2013 | Green et al. | |
| 2015/0103252 | A1 | 4/2015 | Rane et al. | |
| 2018/0313121 | A1* | 11/2018 | Braxton, Jr. | E05C 19/184 |
| 2018/0343459 | A1* | 11/2018 | Jeon | H04N 19/167 |
| 2019/0037234 | A1* | 1/2019 | Ahonen | H04N 19/179 |
| 2019/0110076 | A1* | 4/2019 | Lim | H04N 19/176 |
| 2019/0158813 | A1 | 5/2019 | Rowell et al. | |
| 2020/0351530 | A1 | 11/2020 | Frantz et al. | |

(Continued)

FOREIGN PATENT DOCUMENTS

CN 102216941 A * 10/2011 ......... G05D 23/1905

OTHER PUBLICATIONS

Bangaru et al. Systematically differentiating parametric discontinuities, ACM Transactions on Graphics (TOG), Jul. 19, 2021, pp. 1-8 [online], [retrieved on Jan. 10, 2023]. Retrieved from the Internet <URL: https://dl.acm.org/doi/pdf/10.1145/3450626.3459775 >, entire document, especially p. 2 col. 1 para 5.

*Primary Examiner* — Ming Wu
(74) *Attorney, Agent, or Firm* — David R. Stevens; Stevens Law Group

(57) ABSTRACT

Example image processing systems and methods are described. In one implementation, a recording device captures images and measurements from an inertial measurement unit (IMU). A rendering system generates encoded video data based on the captured images and measurements from the IMU, where the encoded video data includes at least one region that stores supplemental data. The encoded video data is then rendered for viewing by a user proximate a display device.

18 Claims, 11 Drawing Sheets

(56) References Cited

U.S. PATENT DOCUMENTS

2021/0142497 A1    5/2021  Pugh et al.
2021/0225017 A1    7/2021  Holzer et al.
2021/0397004 A1*  12/2021  Schowengerdt ..... G02B 6/0076

* cited by examiner

```
Uniform Array

Index       Value in array at index
0           [1.0, 0.0, 0.0, 0.0, 1.0, 0.0, 0.0, 0.0, 1.0]
1           [0.9, 0.0, 0.1, 0.0, 1.0, 0.0, -0.1, 0.0, 1.0]
2           [0.8, 0.0, 0.2, 0.0, 1.0, 0.0, -0.2, 0.0, 1.0]
...
```

FIG. 4

```
Uniform Array

Index       Value in array at index
0           [0.1, 1000.0]
1           [0.5, 500.0]
2           [0.6, 100.0]
...
```

FIG. 5

```
Uniform Array

Index        Value in array at index
0            1.8
1            1.9
2            2.2
...
```

FIG. 6

```
Uniform Array

Index        Value in array at index
0            [0.5, 0.2, 0.7, 0.1, 1.0, 0.2, 0.4, 0.5, ...]
1            [0.2, 0.9, 0.1, 0.0, 0.4, 0.0, -0.1, 0.2, ...]
2            [0.8, 0.3, 0.2, 0.6, 0.1, 0.8, -0.2, 0.3, ...]
...
```

FIG. 7

IMAGE PROCESSING SYSTEMS AND METHODS

RELATED APPLICATIONS

This application claims the priority benefit of U.S. Provisional Application Ser. No. 63/253,072, filed on Oct. 6, 2021, the disclosure of which is hereby incorporated by reference herein in its entirety. This application also claims the priority benefit of U.S. Provisional Application Ser. No. 63/253,076, filed on Oct. 6, 2021, the disclosure of which is hereby incorporated by reference herein in its entirety.

TECHNICAL FIELD

The present disclosure relates to systems and methods that perform image processing for various types of systems.

BACKGROUND

Uniforms are an important concept in graphics programming with graphics processing units (GPUs) and shaders. GPUs are processors in a computer that accelerate graphics rendering. GPUs are typically programmed using languages such as OpenGL Shading Language (GLSL), which are used for shaders. Shaders are divided into vertex shaders and fragment shaders. Vertex shaders manipulate attribute data associated with a single vertex or point. Fragment shaders operate on the output from vertex shaders, and ultimately produce a color for a fragment/pixel.

Vertex and fragment shaders process many vertices and fragments in parallel, but run the same shader program on each. Both vertex and fragment shaders have a concept called a "uniform" which is a type of variable which stores data that is the same in all parallel executions of the shader, and which comes from an external source, such as the central processing unit (CPU) memory of the computer containing the GPU. A typical program which uses shaders to render on the GPU first sets up a data structure containing uniforms on the CPU, then transfers the uniform data to the GPU so it is available to shaders, using a graphics application programming interface (API) such as OpenGL.

Virtual reality (VR) videos and photos are particular types of media which are intended to be viewed in a VR head-mounted display (HMD), or similar (e.g., an AR or mixed reality display). VR videos and photos may differ from traditional videos and photos in that they often cover a large field of view (sometimes approximately half, or all of a sphere around the viewer), and sometimes they are rendered stereoscopically to produce an effect of 3D for the viewer.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 4 illustrates an embodiment of shader uniforms storing an array of 3×3 rotation matrices.

FIG. 5 illustrates an embodiment of shader uniforms storing a "near" and a "far" value in units of the rendering system.

FIG. 6 illustrates an embodiment of shader uniforms storing gamma correction values, which are used for per-frame gamma correction.

FIG. 7 illustrates an embodiment of shader uniforms storing the parameters of a neural network or differentiable computation graph.

DETAILED DESCRIPTION

Figure 1:
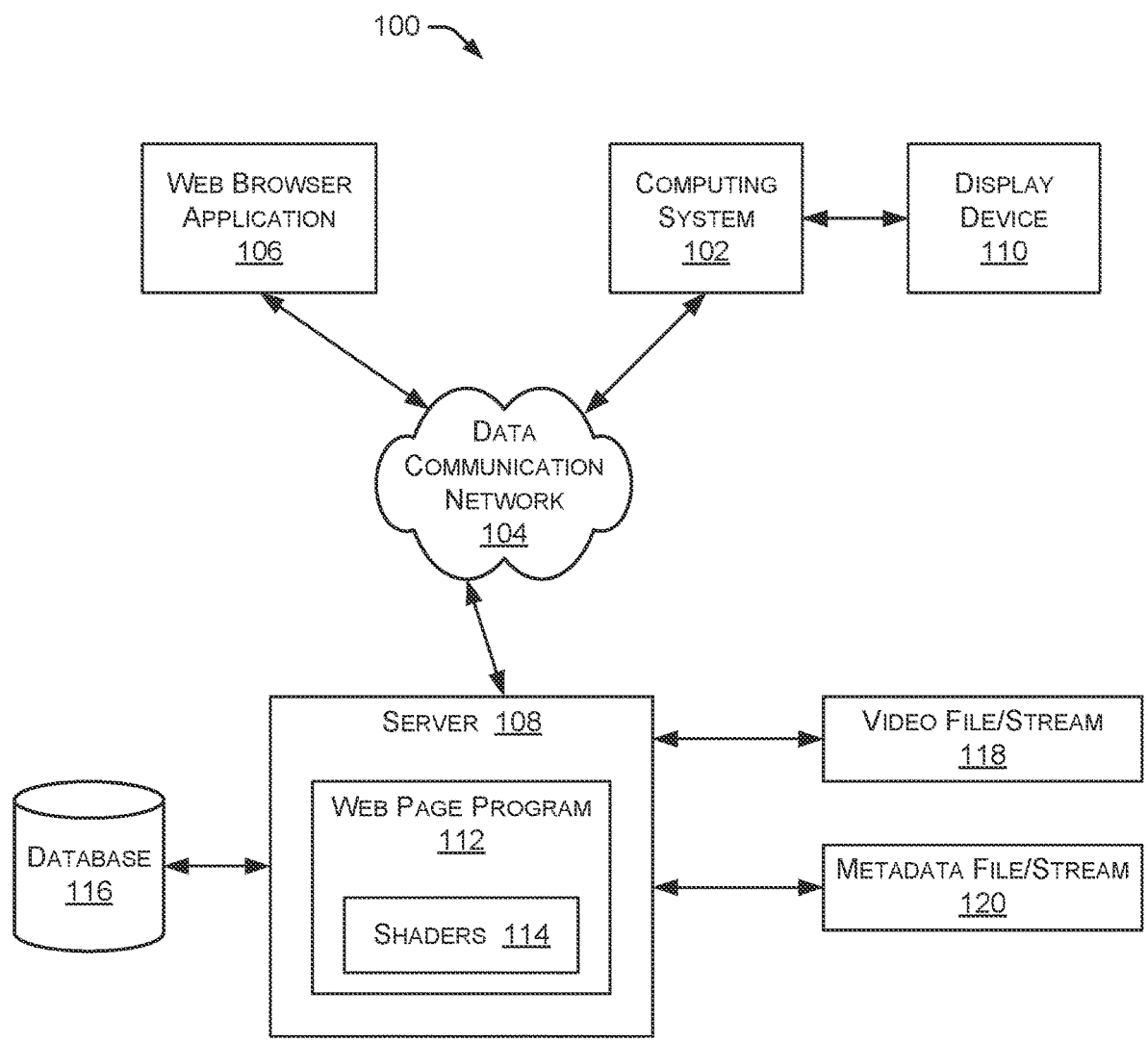
FIG. 1 is a block diagram illustrating an environment within which an example embodiment may be implemented.

In some embodiments, the systems and methods described herein perform various image capture, image processing, image rendering, and related activities. In particular implementations, the described systems and methods support cross-browser synchronization of frame-metadata and shader uniforms for video rendering.

The systems and methods discussed herein may include a system of computer hardware and software that renders video in a web browser. The computer hardware and software may be accelerated by a graphics processing unit (GPU), which enables uniforms in the shaders to be populated with additional metadata that is specific to, and accurately synchronized with, individual frames of video. The described systems and methods include software components that are designed to enable the systems and methods to operate in different web browser applications that may have different capabilities. The systems and methods are particularly valuable for rendering video in virtual reality (VR), but may be similarly applied in any other environment.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

In some embodiments, VR video is rendered using shaders. Certain examples discussed herein render VR video using shaders. However, the systems and methods described herein may also be used with video created or stored using a standard video file format, such as mp4.

In some embodiments, frames of the video are decoded by either a central processing unit (CPU), GPU, or dedicated video decoding processor. The decoded frame data may be stored directly in GPU memory ("DMA") or first decoded into non-GPU memory and then copied. The decoded frame data is a "texture," which is a type of uniform. A geometry object consisting of a set of vertices in a sphere arrangement may be rendered as a triangle mesh. The vertex shader processes other uniforms, such as a model-view-projection matrix to transform the vertices of the sphere from their original coordinate system into a display coordinate system. The fragment shader reads the texture to produce the color of each pixel that is rendered.

Modern web browsers typically support rendering 3D graphics accelerated by a GPU, using shaders. The OpenGL graphics API is supported by most browsers, in the javascript language. Rendering 3D graphics in a web browser often involves code that mixes javascript (which mostly communicates with the CPU and main memory) and GLSL (which communicates with the GPU).

In some embodiments, video files can be played in web browsers using a standard HTML <video> tag. Video objects can be interacted with using javascript. Video objects (which may come from the <video> HTML tag or be created in javascript), can be decoded into textures, which are available as uniforms in GLSL. For a variety of applications, it may be useful to know at any given moment, which exact frame number of video is being displayed. For example, so that additional frame-specific metadata may be loaded into shader uniforms. However, there is no standard method to determine an exact frame of video, or the exact time in a video, which works across all major browsers.

Although some browsers have a feature that can enable determining an exact frame of video, many browsers do hot have such features. In some cases, it is possible to use a 'requestVideoFrameCallback' method of a video object. This function accepts a callback with two arguments: now and metadata. When a new frame of video is decoded, the callback is invoked, and the metadata argument is populated with fields, which include 'mediaTime'. Using mediaTime and knowing the frame rate of the video, it may be possible to calculate a current frame index reliably.

Steganography is the field of embedding information in images or videos, sometimes covertly. An example of steganography is to overwrite several pixels in an image with a special color that stores information.

In some embodiments, the described systems and methods include hardware components and software components. The hardware components may include a CPU, CPU memory, a GPU, and GPU memory, and a display device, such as a display screen. The software components may include a web browser and a web page that is running a program to render a video. For example, the web page may load resources including one or more video and metadata files or streams.

In some embodiments, the web page's program constructs a video object, and plays the video, causing the frames of the video to be decoded as images (e.g., stored in the CPU or GPU memory). The images may be available as texture uniforms, for use in a shader program which runs on the GPU and produces a rendered output to the display. In a particular example, the web page may render two triangles making up a rectangle on the screen, and the shader would simply draw the video texture on the rectangle. This may involve sampling from the video texture to compute the output pixel color at each pixel in the rectangle. In a more complex example, the shader still samples from the video texture, but may perform more complicated processing, such as reading portions of the texture which encode a depth map, distorting or creating geometry to render the corresponding 3D structure of a scene, ray tracing, ray marching, or ray casting a suitable volumetric representation of the scene.

In some embodiments, the web page's program may load one or more files or streams containing metadata about the video. The metadata may include information such as the frame rate of the video. The metadata may also include frame-specific metadata, which is any data that should be precisely synchronized to a specific frame of the video. The frame-specific metadata may be stored in an array or map data structure, which allows for efficiently looking up the metadata given a frame index. In some embodiments, the metadata may be encoded in JavaScript Object Notation (JSON), protocol buffers, or a similar format for storage and transmission.

FIG. 1 is a block diagram illustrating an environment 100 within which an example embodiment may be implemented. As shown in FIG. 1, a computing system 102 is coupled to communicate with a web browser application 106 and a server 108 via a data communication network 104. Computing system 102 performs various computing functions, as discussed herein. Web browser application 106 allows a user to access various websites, web services, and the like. Web browser application 106 may be executed on computing system 102, server 108, or any other system. Server 108 performs various operations, such as hosting web page content, executing web page programs, and the like.

In some embodiments, data communication network 104 includes any type of network topology using any communication protocol. Additionally, data communication network 104 may include a combination of two or more communication networks. In some implementations, data communication network 104 includes a cellular communication network, the Internet, a local area network, a wide area network, or any other communication network. In environment 100, data communication network 104 allows communication between computing device 102, web browser application 106, server, 108, and any number of other systems, devices, and the like.

In some implementations, computing system 102 is coupled to a display device 110 for displaying images, video and the like. In some embodiments, server 108 is coupled to a database 116, which stores various data, such as video data, metadata, shader data, web page data, program data, and the like.

As shown in FIG. 1, server 108 may execute one or more web page programs 112 with one or more associated shaders 114. The execution of web page programs 112 and the use of shaders 114 are discussed in greater detail herein. In some embodiments, server 108 may communicate video files or streamed video data 118 from any number of data sources. Additionally, server 108 may communicate metadata files or streamed metadata 120 from any number of data sources.

In some embodiments, environment 110 may render video in a web browser, such as web browser application 106. Alternatively, the web browser may be located in server 108 or any other system. A web page program 112 may execute inside of a web browser. As discussed herein, web page program 112 contains shaders, which instruct the GPU how to render a scene in a video. The web page program 112 may obtain data consisting of video data and metadata from video files or streams 118. The web browser may communicate with components of computing system 102, such as CPU 204, CPU memory 206, GPU 208, and GPU memory 210. In some embodiments, GPU memory 210 contains an image that will be viewed by a user on display device 110.

It will be appreciated that the embodiment of FIG. 1 is given by way of example only. Other embodiments may include fewer or additional components without departing from the scope of the disclosure. Additionally, illustrated components may be combined or included within other components without limitation.

Figure 2:
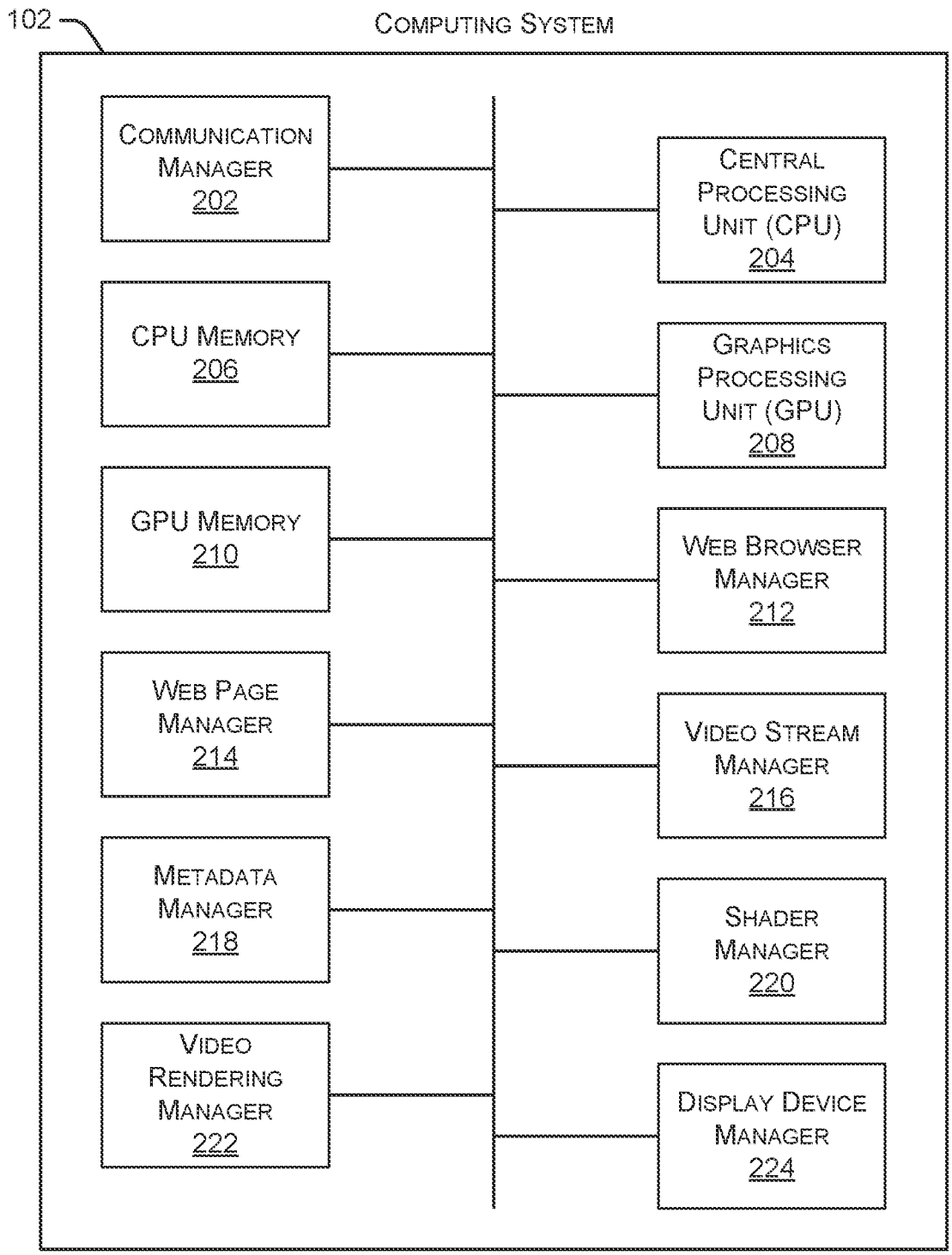
FIG. 2 is a block diagram illustrating an embodiment of a computing system.

FIG. 2 is a block diagram illustrating an embodiment of computing system 102. As shown in FIG. 2, computing system 102 may include a communication manager 202, a CPU 204, a CPU memory 206, a GPU 208, and a GPU memory 210. Communication manager 202 allows computing system 102 to communicate with other systems, such as web browser application 106 and server 108 shown in FIG. 1, and the like.

CPU 204 and GPU 208 can execute various instructions to perform the functionality provided by computing system 102, as discussed herein. CPU memory 206 and GPU memory 210 may stores these instructions as well as other data used by CPU 204, GPU 208, and other modules and components contained in computing system 102.

Additionally, computing system 102 may include a web browser manager 212 that manages various activities performed by web browser application 106 and other web browser applications not shown in FIG. 1. A web page manager 214 manages any number of web pages, such as web pages stored in server 108 or other systems not shown in FIG. 1. A video stream manager 216 manages various operations associated with receiving and sending video files and video streams 118. A metadata manager 216 manages various operations associated with receiving and sending metadata files and streams 120.

In some embodiments, computing system 102 further includes a shader manager 220, a video rendering manager 222, and a display device manager 224. Shader manager 220 manages various shader information and shader operations, as discussed herein. Video rendering manager 222 manages various video rendering operations, as discussed herein. Display device manager 224 manages the display of information, such as video information, on one or more display devices.

Figure 3:
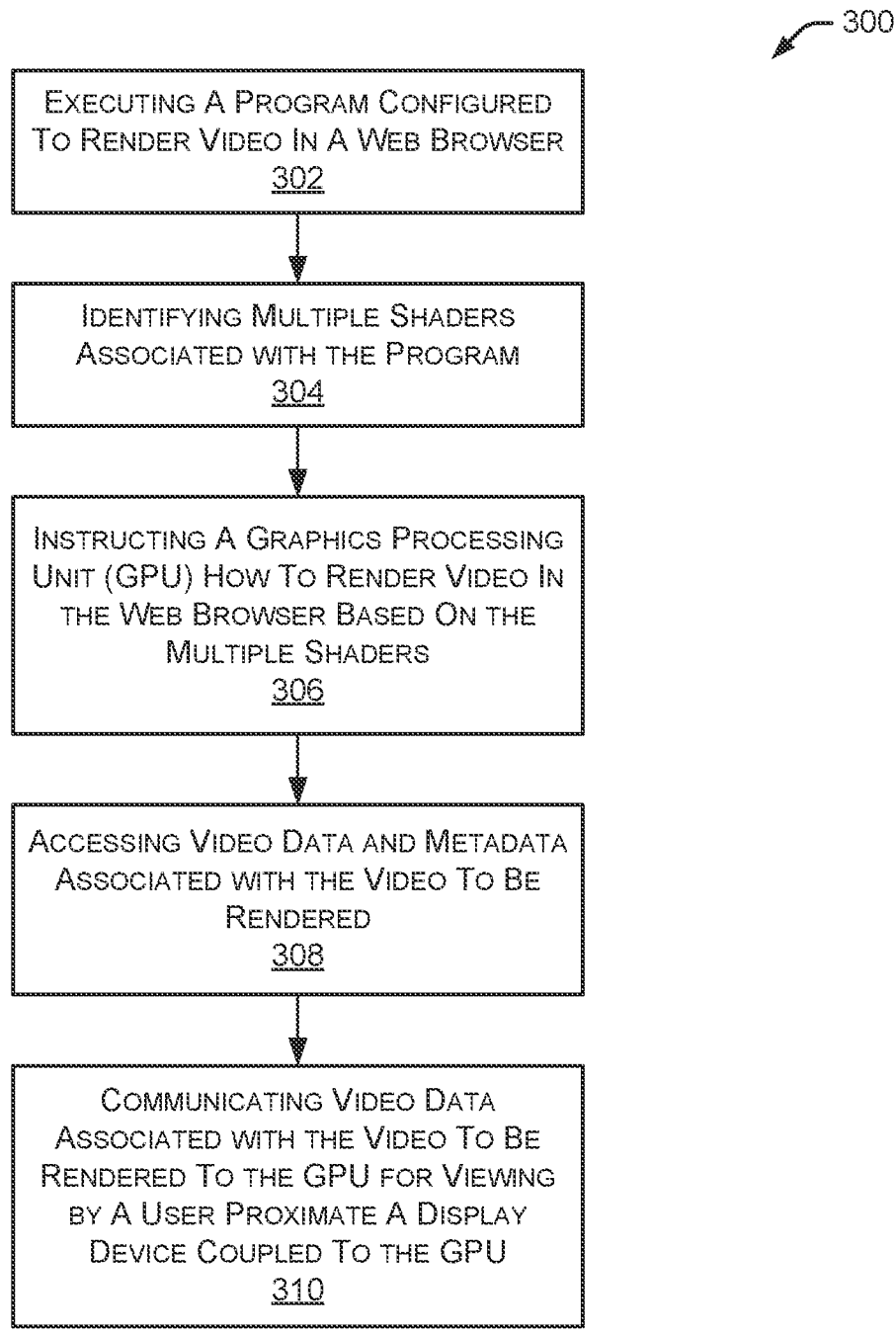
FIG. 3 is a flow diagram illustrating an embodiment of a process for rendering video.

FIG. 3 is a flow diagram illustrating an embodiment of a process 300 for rendering video. Initially, process 300 executes 302 a program configured to render video in a web browser. Process 300 identifies 304 multiple shaders associated with the program being executed. The process continues by instructing 306 a GPU how to render video in the web browser based on the multiple shaders. Process 300 continues by accessing 308 video data and metadata associated with the video to be rendered. Finally, process 300 communicates 310 video data associated with the video to be rendered to the GPU for viewing by a user proximate a display device coupled to the GPU.

FIG. 4 illustrates an embodiment of shader uniforms 400 storing an array of 3×3 rotation matrices, which are stored as a list of nine numbers. Shader uniforms 400 are populated with frame-synchronized metadata by the web page's program. The uniform array index corresponds to the frame index of the video, with some possible offset that can be stored in another uniform. The value in the array at the index is the rotation matrix data. The shader samples the video texture to decode a frame index from the steganography-style code, then uses the decoded frame index to lookup the appropriate element of the uniform array. In the example of FIG. 4, the shader might then transform the vertex geometry by applying the rotation matrix. This idea can be extended to a 4×4 transformation matrix, or any other parameterization of a 6DOF pose (e.g., using a 3D vector for translation and a quaternion or axis-angle representation of rotation).

FIG. 5 illustrates an embodiment of shader uniforms 500 storing a "near" and a "far" value in units of the rendering system (e.g., meters). In some embodiments, the shader decodes the frame index as described in FIG. 1, then looks up the element in the uniform array, which is a near and a far value specific to the current frame of video. The shader then renders a 3D scene, where parts of the scene geometry are constructed by sampling depth or inverse depth values from a specific region of the video texture, then distorting some predefined geometry such as part of a sphere. While constructing the scene geometry from depth or inverse depth texture data, the shader modifies the mapping from texture values to distances using a function which incorporates the near and far uniform values. This enables the 3D structure to be rendered with fewer artifacts resulting from quantization in the texture, by using the available bits of the texture to put more detail where the scene has interesting content.

FIG. 6 illustrates an embodiment of shader uniforms 600 storing gamma correction values, which are used for per-frame gamma correction. In some embodiments, the shader decodes the frame index as described in FIG. 1, then looks up the element in the uniform array, which is a gamma value specific to the current frame of video. Then, the (fragment) shader raises the color of each pixel to the power of gamma. This enables the video to be rendered with a wider range of possible colors than using a video file or stream alone, without additional frame-synchronized metadata.

FIG. 7 illustrates an embodiment of shader uniforms 700 storing the parameters of a neural network or differentiable computation graph, which is part (or all) of the rendering pipeline. The parameters of the neural network or differentiable computation graph may be different in each frame. The rendering also involves sampling some pixels from a video texture. The shader decodes the frame index as described in FIG. 1, then looks up the element in the uniform array, which is a set of parameters for the neural network or differentiable computation graph. This enables video to be rendered using time-varying neural networks or differentiable computation graph methods.

A goal of the systems and methods described herein is to get the frame-specific metadata into the shader uniforms and to have the correct metadata for the frame index of video which is in the texture. This is non-trivial due to limitations in existing web browser APIs. The described systems and methods include at least two different methods of synchronizing frame-specific metadata to shader uniforms, which may be used in web browsers with different capabilities.

A first method for frame-specific metadata synchronization to shader uniforms may be applied when the web browser supports the 'requestVideoFrameCallback' method or provides any other method of precisely knowing the current frame index before it is rendered. For example, a web page's program may register a callback function for 'requestVideoFrameCallback'. Before a new frame is rendered, this callback executes, and it is passed an object which contains sufficient information to calculate the exact frame index of the video which is about to be rendered. The web page's program looks up the frame-specific metadata for the current frame index, then binds this data to the shader's uniforms. This idea can be generalized to any new browser API which provides a different way to know the exact frame index of video before it is rendered.

A second method for frame-specific metadata synchronization to shader uniforms may be applied when the web browser does not provide any other way for the web page's program to determine the exact frame index of video before it is rendered. In this method, the index of each frame of video is encoded in the frame image using a method related to steganography. In some embodiments, the frame index is an integer. For example, the integer frame index may be encoded by drawing a series of boxes in the top-left corner of the image, with each box being white or black to encode one bit. A more efficient encoding could achieve three bits per box by using each of the red, green, and blue color channels. Many other encodings are possible and they would present different tradeoffs. The shader calculates the encoded frame index by sampling the video texture in the appropriate locations and performing arithmetic operations. Instead of having a single set of uniforms corresponding to the frame specific metadata (as in the first method), the shader has an array of uniforms. In the web page's program, it may not be possible to know the exact current frame, but it is often possible to get a rough timestamp (e.g., the currentTime property of a video object), which may be updated occasionally (e.g., by the 'timeupdate' event on video objects). Whenever the web page's program determines the video's timestamp has updated, it binds an array of uniforms containing frame-specific metadata for a time interval surrounding the current video time. Then, in the shader, the exact frame index that has been decoded is used to lookup the correct element of the uniform array, to retrieve the frame-specific metadata uniforms that correspond with the current frame of video in the texture. An additional uniform storing an offset for the index in the array may also be used.

One application of the systems and methods described herein is to video in virtual reality environments. For example, suppose there are one or more cameras, possibly with wide-angle lenses, recording a scene, and the cameras are moving and/or rotating. It is desirable to render the video recorded by such a camera in VR in such a way as to minimize vestibulo-ocular conflict. Vestibulo-ocular conflict occurs when the viewer's eyes and inner ear provide conflicting information regarding any motion of the viewer's head. For example, if a recording camera accelerates and the viewer watches the video without moving, the viewer's eyes will perceive motion, but their inner ear will not, which creates conflict and potential motion sickness.

To minimize vestibulo-ocular conflict, it is useful to track the motion and rotation of the recording camera (e.g., using visual-inertial odometry), store the camera's position and/or rotation in each frame of video, and then render the video in a shader. The shader then applies the position and/or rotation of each frame to the scene's geometry as it is rendering each frame, which requires frame-accurate synchronization of the frame's metadata storing position/rotation and the shader uniforms. Thus, even if the real camera moved while it recorded the video, the rotational component of its motion can be eliminated in the VR rendering, which reduces vestibulo-ocular conflict.

When the user watches the video in VR, the rendering responds to the user's head motion, which is different from rotation of the recording camera. Rotation of the VR view in response to head motion does not produce vestibulo-ocular conflict because the rendered view moves consistently with the senses from the user's inner ear. In this example, the frame-metadata to be synchronized consists of a rotation and/or translation of the recording camera. This example is further illustrated in FIG. 4.

Another application of the systems and methods described herein is to render 3D video, which may be represented as a texture which stores in different regions, color and depth or inverse depth maps. At the time of rendering, a shader samples the texture data for both color and depth, and uses this data to build a final rendered view. However, video is limited in the bit depth which each pixel can contain. Many web browsers support 8 bits per channel, and some support 10 bits per channel. When such a texture is used to store a depth map, the limited number of bits implies a quantization of depth into a discrete set of values. Rendering such data may lead to "staircase" artifacts, where the original 3D geometry is smooth, but the rendering appears bumpy. This limitation can be improved by an application of the invention, where the per-frame metadata to be synchronized into uniforms stores constants that enable for a more flexible mapping between the depth value stored in a quantized texture, and a distance value in units of the rendering engine such as meters. An equation in the shader must map numbers in this range of the quantized texture to distances in meters. Without using the described systems and methods, a single equation is used for this mapping in all frames of the video.

With the described systems and methods, the mapping can be updated in each frame of the video, in response to the content of the scene. For example, the synchronized metadata might store a "near" and "far" value in meters, or other parameters of a function mapping texture values to distances. This example is further illustrated in FIG. 5.

Another application of the systems and methods described herein is for rendering high-dynamic range (HDR) video. The fidelity with which colors can be represented is limited by the bit depth of a video encoding. Typical videos are encoded with 8 or 10 bits per channel, which gives a finite number of distinct shades of color. In this example application, the described systems and methods encode in the frame-specific metadata one or more parameters for a function which maps original colors in the video to new colors. An example of such a parameter includes a frame-specific 'gamma' (then the output color is the input color raised to the power of gamma). More parameters may be used to adjust different color channels or apply color correction (aka grading). The new color is computed in a shader, and the parameters of the color-mapping function are uniforms. This example is further illustrated in FIG. 6.

Another application of the systems and methods described herein involves any rendering pipeline in which a neural network or differentiable computation graph (e.g., as constructed by TensorFlow or PyTorch) computes all or some part of the rendering. For example, a neural network can directly output an image, or a traditional rendering pipeline involving triangles and shaders may render some part of the image, then a neural network might further process the pixels in the image. The computation of the neural network or differentiable computation graph element may be computed in a shader, and the parameters of that element may be stored in uniforms. Thus, the systems and methods enable a rendering pipeline which involves a neural network or differentiable computation graph element whose parameters vary as a function of time, and which also uses texture data from a video. This example is further illustrated in FIG. 7.

In some embodiments, VR videos and photos can be rendered in an HMD such that the rendered view for the user responds to the user's head motion, which contributes to a feeling of presence or immersion in VR, augmented reality (AR), or mixed reality (MR). VR videos and photos may be divided into categories based on the degree to which the rendering responds to different components of head motion. The majority of VR videos and photos today only respond to the user's head rotation, which has three degrees of freedom. Such content may be referred to as 3DOF. A problem with 3DOF content is that if the user translates their head, the rendered view does not respond appropriately, which leads to a mismatch between what the user's eyes see, and perception of motion from the inner ear (formally, this mismatch may be called vestibulo-ocular conflict). Vestibulo-ocular conflict is a primary cause of motion sickness in VR.

As opposed to 3DOF, some VR video and photo technologies enable six degrees of freedom (6DOF) rendering, which means that the rendered view in the HMD responds to both the user's head rotation and translation. 6DOF typically implies that for each frame of video, there is a full 3D representation of a scene, which can be rendered from any pose. 6DOF video is more technically challenging than 3DOF to create, compress, and render efficiently, but has an advantage of being more comfortable and immersive, and causing less vestibulo-ocular conflict for the viewer.

VR video and photos are often rendered with acceleration from a GPU or other graphics accelerator, which is often programmed using vertex and fragment shaders. The rendering program sets up some initial geometry consisting of vertices with position and texture coordinate attributes, then commands a graphics API such as OpenGL to render the geometry using a particular vertex and fragment shader. The fragment shader operates on the vertex attributes, as well as uniforms (which are like global variables that are passed from the host device to the shaders). Uniforms often include the model-view-projection transformation matrices that are associated with the rendering camera's pose and view-frustum. Outputs from the vertex shader and uniforms are processed in the fragment shader to produce a result color for each pixel in a display.

VR videos and photos are commonly compressed using conventional video or photo formats, such as h264, h265, vp9, jpeg, or png. These formats typically store a rectangular image for each frame of video or photo. Typically, the rectangular image is stretched, warped, or texture mapped onto a specific geometry, so that it covers part or all of a sphere. The manner in which this is done is related to the "projection" of the compressed media.

For example, equirectangular projection is very common for 360 video or VR180 video. Equirectangular projection is a way of stretching a rectangular image around a sphere, similar to a map of the world. This format can be rendered relatively simply by first setting up vertices in a sphere geometry, then using a shader that samples the corresponding part of a texture using the equirectangular projection. This approach can be extended to stereoscopic rendering by switching which texture or which part of the texture is used for each eye. This method is sometimes referred to as omnidirectional stereo (ODS) or VR180. ODS and VR180 give an impression of 3D, but are not 6DOF, and produce inconsistent views for the left and right eye under a wide variety of conditions, which may cause discomfort.

The concept of a projection is also important for describing lenses. Here the idea has a different meaning (it is not about how to wrap a rectangle around a sphere, like equirectangular projection). Instead, a lens' projection approximates the correspondence between pixels and ray directions coming in or out of the lens. Some projections for lenses include f-theta, stereographic, equidistant, equiangular, equisolid, rectilinear, or orthographic. It is relatively uncommon to store VR video or photos in projections such as these.

In some embodiments, the systems and methods described herein include rendering software and rendering systems that process data captured by one or more recording devices to produce an encoded video or photo. Display software and display systems may present the video or photo on a display device.

In some implementations, the described systems and methods use an f-theta projection or similar projection in conjunction with frame-specific metadata containing a pose associated with the one or more recording devices. F-theta projection is a model that relates 2D pixel coordinates on an image to 3D ray directions going into or out of the camera in the world. One way to describe these equations is to consider a 2D point on the image relative to the optical center (which is a 2D pixel coordinate near the middle of the image), in polar coordinates. In f-theta projection, the distance in pixels (2D) from the optical center is proportional to the angle away from the forward direction of the camera (3D). The constant of proportionality depends on the focal length of the lens. The polar coordinate angle in the 2D image is the same as the angle in 3D of the ray (as a rotation in the plane perpendicular to the forward direction of the camera).

F-theta projection is commonly used for lenses with near 180 degree field of view, although it is also applicable to lenses with lower field of view. F-theta projections make an "image circle" which is the in the primary region of pixels that are illuminated by light coming through the lens. This circle may be larger or smaller than the image, either resulting in all pixels being covered, or only some pixels being covered (sometimes in the shape of a circle or partially cut off circle, or an oval). The F-theta projection model can be generalized to include radial distortion polynomials, asymmetric distortion parameters, and different focal lengths in the x or y direction, to account for non-ideal optics. Some lenses are optically designed to be as close as possible to f-theta projection, and other lenses are not, but the f-theta equations may still be used as an approximation.

Figure 8:
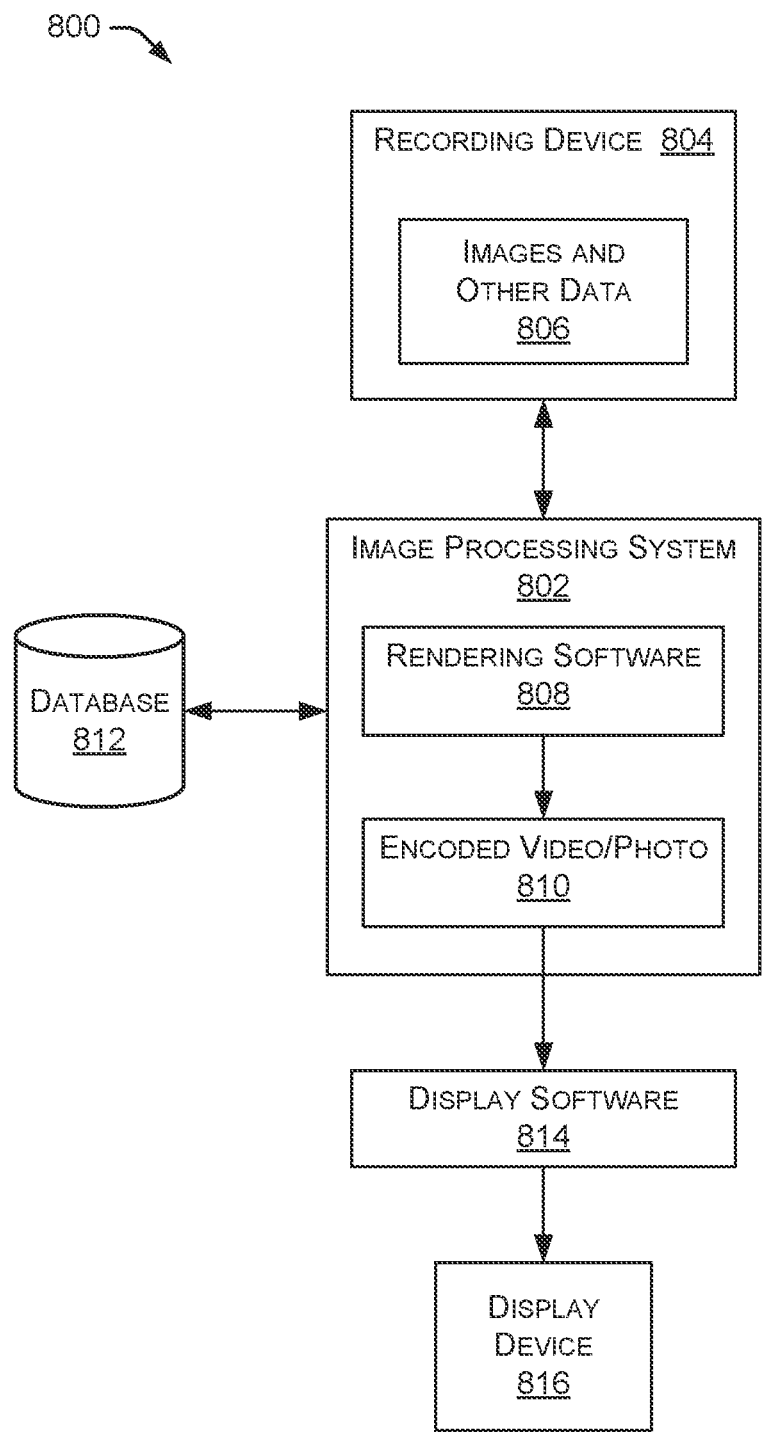
FIG. 8 is a block diagram illustrating an environment within which an example embodiment may be implemented.

FIG. 8 is a block diagram illustrating an environment 800 within which an example embodiment may be implemented. As shown in FIG. 8, an image processing system 802 is coupled to one or more recording devices 804, which may capture and record images and other data 806. In some embodiments, images and other data 806 are communicated to image processing system 802 using any type of wired or wireless communication link.

In some implementations, image processing system 802 includes rendering software 808 that processes the received images and other data 806. The output of rendering software 808 is encoded video/photo data 810. Various types of data and other information used by, or created by, image processing system 802 may be stored in a database 812 coupled to (or contained within) image processing system 802.

Encoded video/photo data 810 is provided to display software 814 and/or other systems to manage the display of encoded video/photo data 810 on a display device 816, such as a display screen.

In some embodiments, recording device 804 may include any number of cameras, inertial measurement units (IMUs), microphones, sensors (e.g., a global positioning system (GPS), a magnetometer, a barometer, or lidar), sources of illumination, and the like. In particular implementations, recording device 804 may be wearable by a person. For example, recording device 804 may be incorporated into a pair of glasses, a helmet, a hat, or a pin.

In some embodiments, recording device 804 may include an array of cameras mounted on a tripod, gimbal, or other structure. In other embodiments, recording device 804 may be incorporated into, or mounted on, a drone, quadcopter, autonomous vehicle, robot, and the like.

During operation, recording device 804 may capture videos that represent a time-series of images and other data. In other implementations, recording device 804 may capture a single image (e.g., photo).

In some embodiments, images and other data 806 contains one or more images from an array of cameras that are synchronized such that multiple images of the same moment in time are captured from different points of view. This image and other data 806 may be used to perform 3D scene reconstruction.

In some implementations, rendering software 808 processes image and other data 806 by applying various techniques known in the fields of computer vision and robotics perception. These applied techniques may include photogrammetry, videogrammetry, implicit representations, structure from motion, visual and/or inertial odometry, multi-view stereo depth estimation, or monoscopic depth estimation that estimate recording device 804 sensor motion with respect to a fixed reference frame, and various representations of the 3D structure of the scene, which may vary as a function of time.

In a particular implementation, recording device 804 includes two cameras with fisheye lenses close to 180 degrees in FOV and one or more IMUS. In this example, rendering software 808 uses visual inertial odometry to estimate a motion of recording device 804 with respect to a fixed, gravity-aligned coordinate frame. Rendering software 808 may rectify the images as part of its processing pipeline, including spherical epipolar rectification in the case of fisheye lenses. Rendering software 808 may use a precomputed calibration of recording device 804, which includes sensor poses and intrinsic parameters (such as lens distortion). Additionally, rendering software 808 may refine the calibration estimates jointly with visual-inertial odometry. Rendering software 808 may use disparity or optical flow in the rectified images to estimate a depth map for each pixel of the images.

In some embodiments, rendering software 808 may use neural networks or other differentiable computation graphs as part of 3D scene reconstruction. For example, a neural network may compute the disparity or optical flow between a pair of images, which is enough to infer depth at each pixel. In other embodiments, a neural radiance field, neural light field, or any works extending these methods may represent the 3D scene.

In particular embodiments, rendering software 808 may output encoded video/photo 810 that includes a rendered image representing each frame of video (or a single frame in the case of a photo). Encoded video/photo 810 may contain images or video files, and metadata containing information such as the camera pose with respect to a fixed (gravity-aligned) coordinate frame, at each frame of video, the frame-rate of the video, any other frame-specific metadata (e.g., a gamma correction value), and the like.

Figure 10:
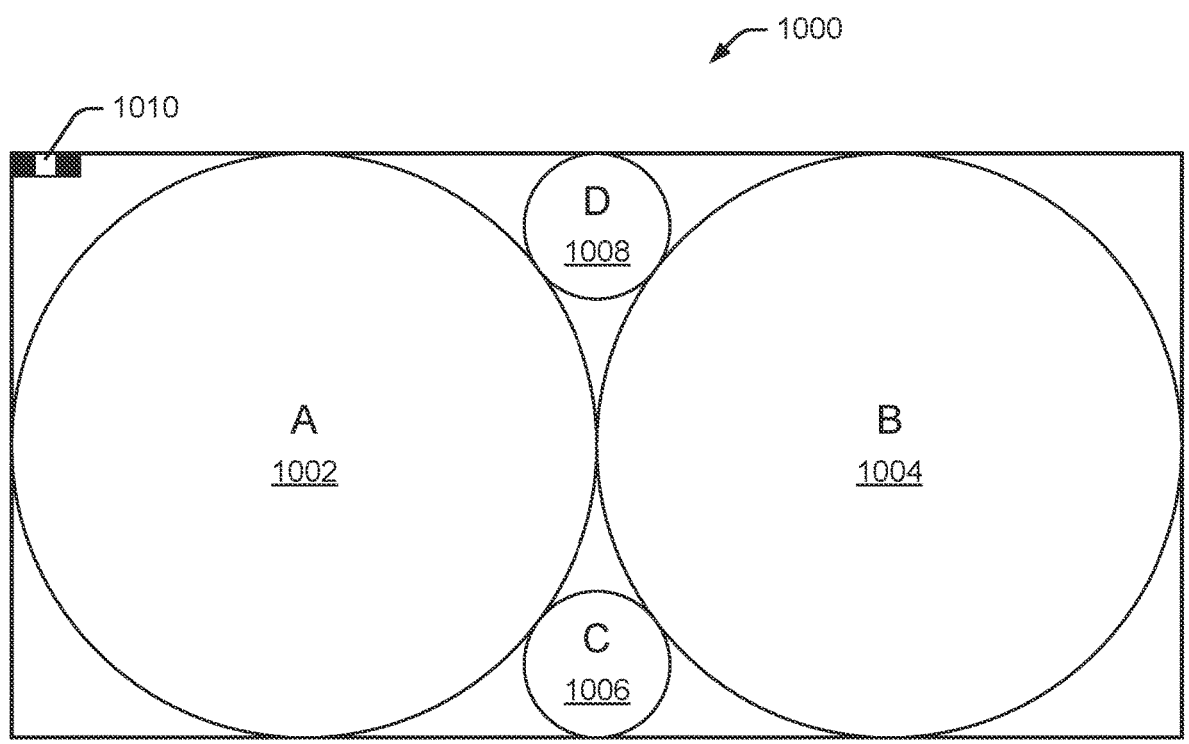
FIG. 10 illustrates an embodiment of a video frame with multiple regions that store different information.
Figure 11:
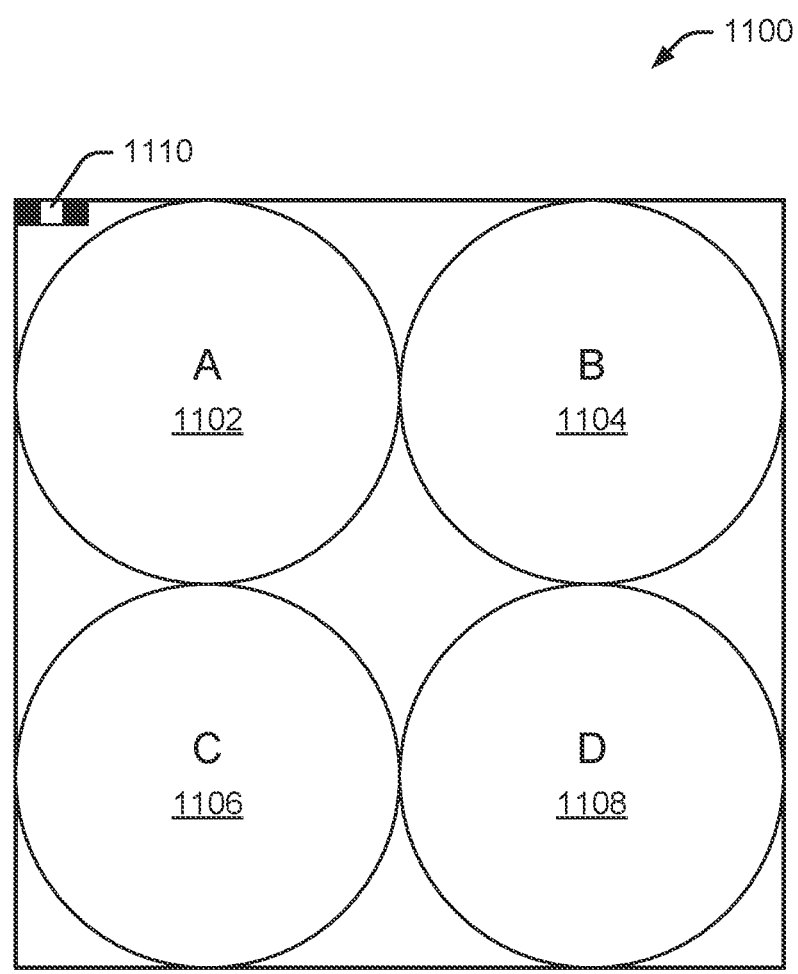
FIG. 11 illustrates another embodiment of a video frame with multiple regions that store different information.
Figure 12:
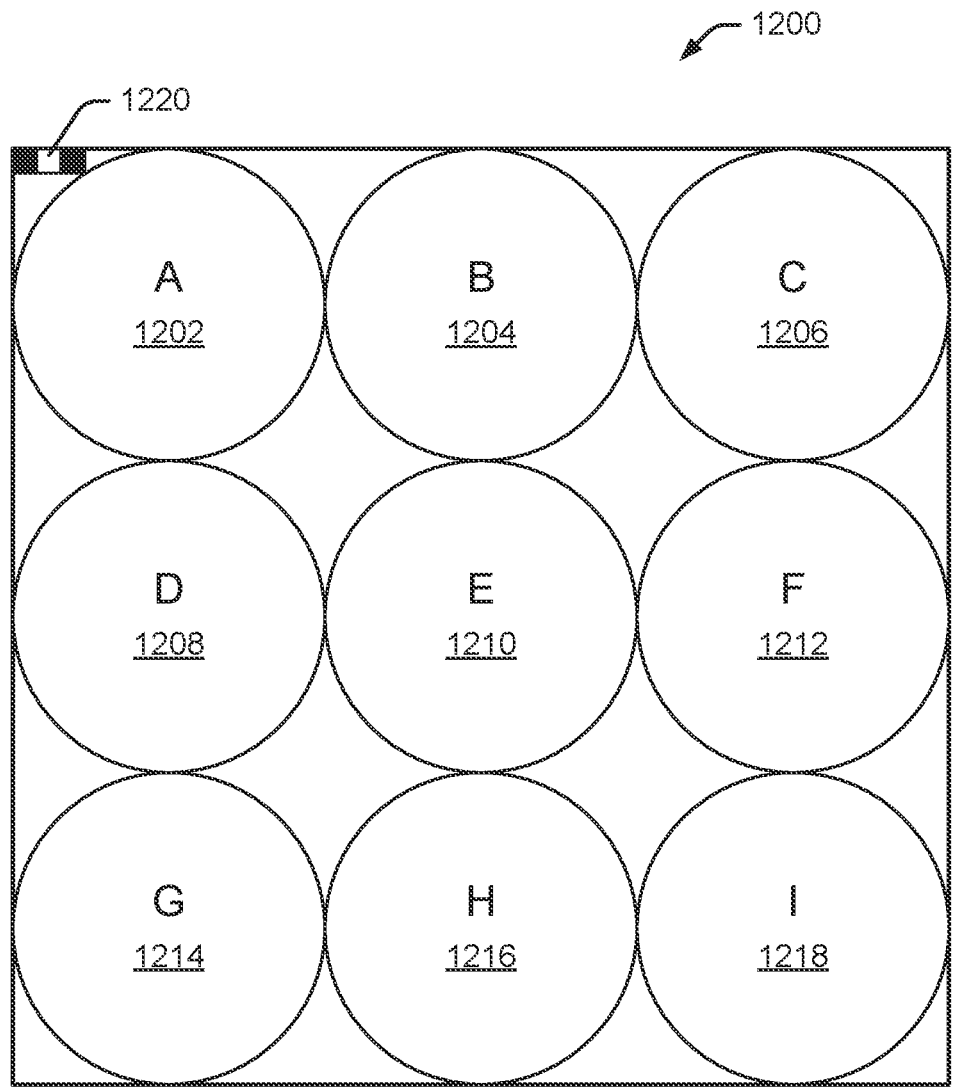
FIG. 12 illustrates another embodiment of a video frame with multiple regions that store different information.

In some embodiments, encoded video/photo 810 includes for each frame, a rendered image, which stores color, depth, and possibly other data in different regions. FIGS. 10, 11, and 12 discussed herein, illustrate example arrangements of data storage in different regions.

In particular implementations, encoded video/photo 810 may include a rendered image for each frame, which is partitioned into regions. Some of these regions may store the color image of a camera, with some warping applied to the original image such that the encoded image is in f-theta (e.g., equidistant/equiangular) projection. This may involve a calibrated model of the camera's distortion, which is used to produce a canonical f-theta or other projection without distortion.

In some embodiments, f-theta projection is used as an example, but may be replaced by any other common projection for lenses, including stereographic, equidistant, equiangular, equisolid, rectilinear, or orthographic projections.

The rendered image can be partitioned in any suitable fashion into regions containing image colors, depths, or other data (e.g., normals, specularity, spherical harmonic coefficients, or neural network parameters). For example, the rendered image could be partitioned into circles or rectangles.

In some embodiments, the rendered image is partitioned as illustrated in FIG. 10 into a region containing the color image for a foreground layer and a corresponding region containing the inverse depth map for the foreground layer. In other regions, the rendered image contains a color image for the background layer, and its inverse depth map. The rendered image also stores a code using a method similar to steganography, where some blocks of pixels in the image encode bits of metadata (e.g., the index of the current frame of video).

In some embodiments, rendering software 808 may generate the background layer portion of the rendered image using methods for in-painting or depth-peeling. In particular implementations, rendering software 808 may output encoded video/photo 810 directly to a stream and transmits it over a network (e.g., live streaming).

In some embodiments, rendering software 808 may compress the sequence of rendered images for each frame into a standard video format such as h264, h265, vp9, and the like. In the case of photos, rendering software 808 may compress the rendered image into standard image formats such as jpeg, png, and the like.

In some embodiments, display software 814 is a native application, and in others it is a web page's program that executes in a web browser.

In particular embodiments, display software 814 may load encoded video/photo 810 and associated metadata from one or more files or streams. Display software 814 may render 3D graphics accelerated by a GPU or other graphics processing architecture, by interfacing with a graphics API (such as OpenGL), to provide vertex geometry, and vertex and fragment shaders. The vertex and fragment shaders may execute in parallel on the GPU or other graphics processing architecture. Display software 814 may decode the compressed video or photos into a texture that is accessible by shaders executing on the GPU. Display software 814 may set up some initial geometry and shaders, including vertex and fragment shaders for the foreground and background layers. Then it executes commands in the graphics API, which cause the shaders to be executed on the GPU, and ultimately produce a final output for display device 816.

The shaders may decode a steganography code (e.g., code 1010 illustrated in FIG. 10) to calculate the specific frame index, in order to look up the corresponding element of an array of uniforms containing per-frame metadata. The shaders may also be provided directly with per-frame metadata, by binding a single uniform (as opposed to an array of uniforms), without the need to decode a steganography code. The per-frame metadata may contain a 3×3 rotation matrix or 4×4 pose, which is applied to rotate or transform the geometry in the vertex shader. The rotation or pose transforms may come from an estimate of camera motion computed in rendering software 808 using visual-inertial odometry. Therefore, when replaying the video, the original motion of recording device 804 may be reproduced in the rendering, which is important for minimizing vestibuloocular conflict.

In some embodiments, the display software 814 renders a 3D scene as one or more layers, such as a foreground layer and a background layer. Other embodiments may include any number of layers by performing different partitioning of the rendered image. For each layer, (a) display software 814 constructs an initial geometry consisting of vertices with position and texture coordinate attributes, (b) there is a vertex and fragment shader used in drawing the layer, and (c) there are specific regions of the rendered image that contain information relevant to drawing the layer, such as a color image, or inverse depth map. The layers may be rendered one at a time, and may (or may not) use depth tests and alpha blending.

In a particular example, when the rendered image is partitioned into circles and f-theta projection is used, the corresponding geometry and vertex data in display software 814 for each layer can simply be a half-sphere grid of triangles, with texture coordinates that directly map to the corresponding location in the rendered image. In this example, the vertex shader reads part of the rendered image which corresponds to inverse depth, and deforms the initial geometry by moving the vertices. Thereby, the vertex shader builds a full 3D scene of triangles, which can be rendered from any point of view.

In some embodiments, display software 814 divides the geometry for each layer into smaller subsets of triangles ("patches"), and uses frustum culling to avoid drawing patches that are not visible.

In some implementations, rendering software 808 or display software 814 may apply additional graphics effects beyond just rendering the video content. These graphics effects may use the depth information encoded in some regions of the rendered image. Such graphics effects might be referred to as "AR" or "filters".

In some embodiments, display device 816 is a conventional 2D screen. In other embodiments, display device 816 is a virtual, augmented, or mixed reality head-mounted display.

In some embodiments where display device 816 is a head-mounted display or similar, the vertex shader transforms vertex positions based on (a) the corresponding inverse depth data in an appropriate part of the rendered image, (b) frame-specific metadata that may include a transform which comes from an estimate by rendering software 808 of the motion of recording device 804 with respect to a fixed coordinate frame, and (c) a transform that is based on the sensed motion of the head-mounted display. As a result, the user of the head-mounted display sees a fully 3D scene, which responds to their head rotation and translation (i.e., 6 degrees of freedom or 6DOF), and also minimizes vestibulo-ocular conflict because motion of recording device 804 is compensated.

Figure 9:
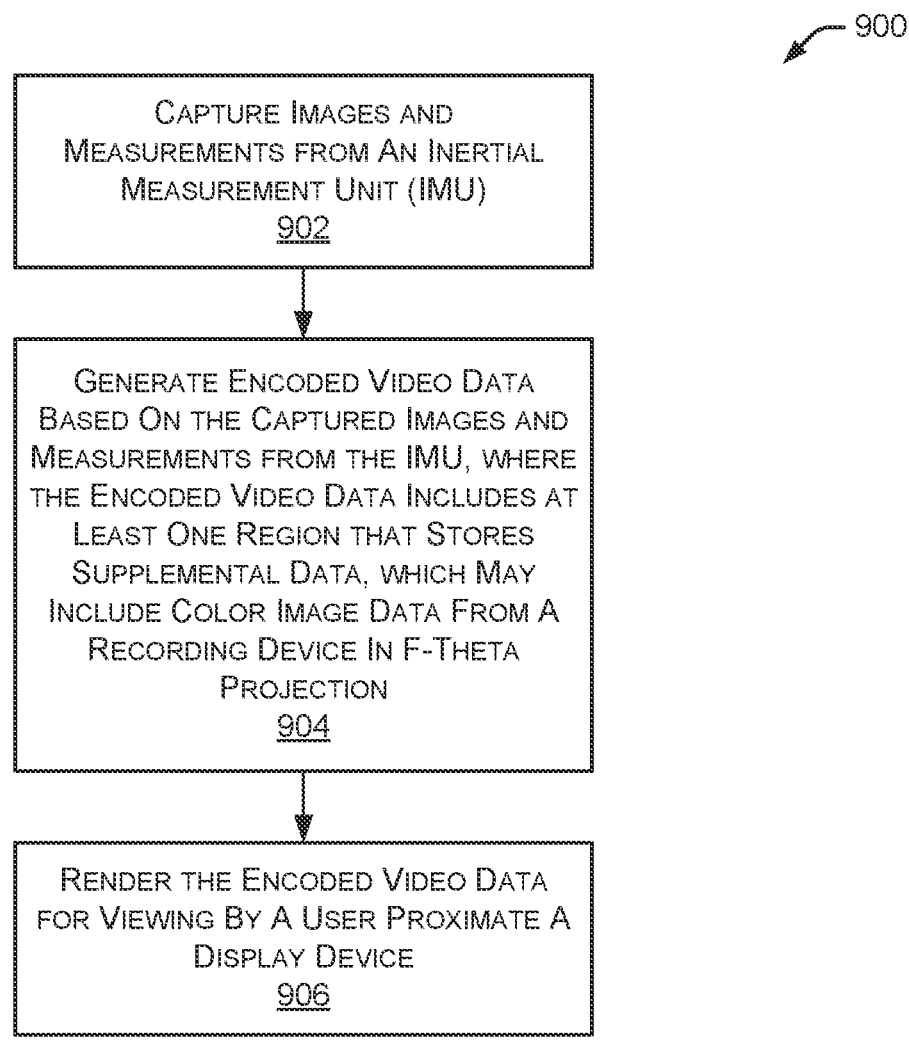
FIG. 9 is a flow diagram illustrating an embodiment of a process for rendering video.

FIG. 9 is a flow diagram illustrating an embodiment of a process 900 for rendering video. Initially, process 900 captures 902 images and measurements from an IMU and/or other sensors. The process generates 904 encoded video data based on the captured images and measurements from the IMU or another sensor. The encoded video data includes at least one region that stores supplemental data, such as color image data, from a recording device in f-theta projection. As discussed herein, the supplemental data may include color image data, depth data, inverse depth data, and the like. Process 900 continues by rendering 906 the encoded video data for viewing by a user proximate a display device.

FIG. 10 illustrates an embodiment of a video frame 1000 with multiple regions that store different information. In some embodiments, video frame 1000 is an encoded video/photo, such as encoded video/photo 810 shown in FIG. 8, that includes regions which store color information, depth information, inverse depth information, and other types of information that is used to render a 3D scene.

As shown in FIG. 10, a region A 1002 stores the color image from a camera in f-theta projection. A region B 1004 stores an inverse depth map which corresponds to region A 1002. Regions C 1006 and D 1008 are used to store a second/background layer of the scene, which is rendered behind the content of regions A 1002 and B 1004. For example, region C 1006 might store colors and region D 1008 might store inverse depths of the second/background layer. In this example, another region 1010 stores a steganography-style code with some additional information about video frame 1000 (e.g., the frame index, which is an integer encoded in the color of a series of boxes in the texture). In some embodiments, regions 1002-1010 may store information that is used during 6DOF rendering.

FIG. 11 illustrates another embodiment of a video frame 1100 with multiple regions that store different information. In the example of FIG. 11, a region A 1102 stores a foreground (layer 1) image, a region B 1104 stores foreground inverse depth information a region C 1106 stores a background (layer 2) image, and a region D 1108 stores background inverse depth information. Additionally, another region 1110 stores a steganography-style code with some additional information about video frame 1100 (e.g., the frame index, which is an integer encoded in the color of a series of boxes in the texture).

In some embodiments, the examples of FIG. 10 and FIG. 11 both illustrate a format with two layers, such as a foreground layers and a background layer in f-theta projection, with corresponding circular regions for image colors and inverse depth maps. In the example of FIG. 10, the smaller regions 1006 and 1008 are used for the background information and the larger regions 1002 and 1004 store the foreground information. This is particularly useful when it is desirable to have a smaller image/video size and the situation can accept less detail in the background layer.

The example of FIG. 11 uses four regions 1102-1108 of the same size, so the same region size is used for both foreground information and background information. In some embodiments, the example of FIG. 11 may have a larger image/video size than the example of FIG. 10, and the background layer has the same level of detail as the foreground layer.

FIG. 12 illustrates another embodiment of a video frame 1200 with multiple regions that store different information. In the example of FIG. 12, there are three layers of information, which may be referred to as layer 1, layer 2, and layer 3 (instead of foreground and background). For each layer 1-3, the information may include, for example, image colors, inverse depth, and an alpha channel. In some embodiments, the alpha channel is calculated "on the fly" in the shaders. In other embodiments, the alpha channel is pre-computed and stored in an image/texture, such as the following.

An example arrangement for three layers with image colors, inverse depth, and alpha channels is:
Layer 1: A—color, B—inverse depth, C—alpha
Layer 2: D—color, E—inverse depth, F—alpha
Layer 3: G—color, H—inverse depth, I—alpha In some embodiments, the example of FIG. 12 supports three layers of information (as compared to two layers of information in FIGS. 10 and 11). Other embodiments may use any number of layers with multiple regions arranged in any manner, where the regions correspond to image/color information, depth information, and alpha channel to fill a rectangle associated with an image/texture.

The three layers of information shown in FIG. 12 may provide a more accurate and detailed 3D representation of a scene. For example, if a ray coming out of the camera would intersect solid objects in the scene at three or more points, at least three layers are necessary to properly reflect that scenario. In general, adding more layers beyond the first layer provides the viewer with more realistic imagery when they look behind the objects closest to the viewer.

In some embodiments, multiple layers with alpha channels are useful in representing scenes with transparent or reflective objects. For example, when looking through a window, a user might see a depth of the window itself, an apparent depth of a reflection in the window, and a depth of a scene behind the window. In some implementations, alpha channels and alpha blending are also useful for representing small or thin objects such as hair, which may occupy less than one pixel.

Figure 13:
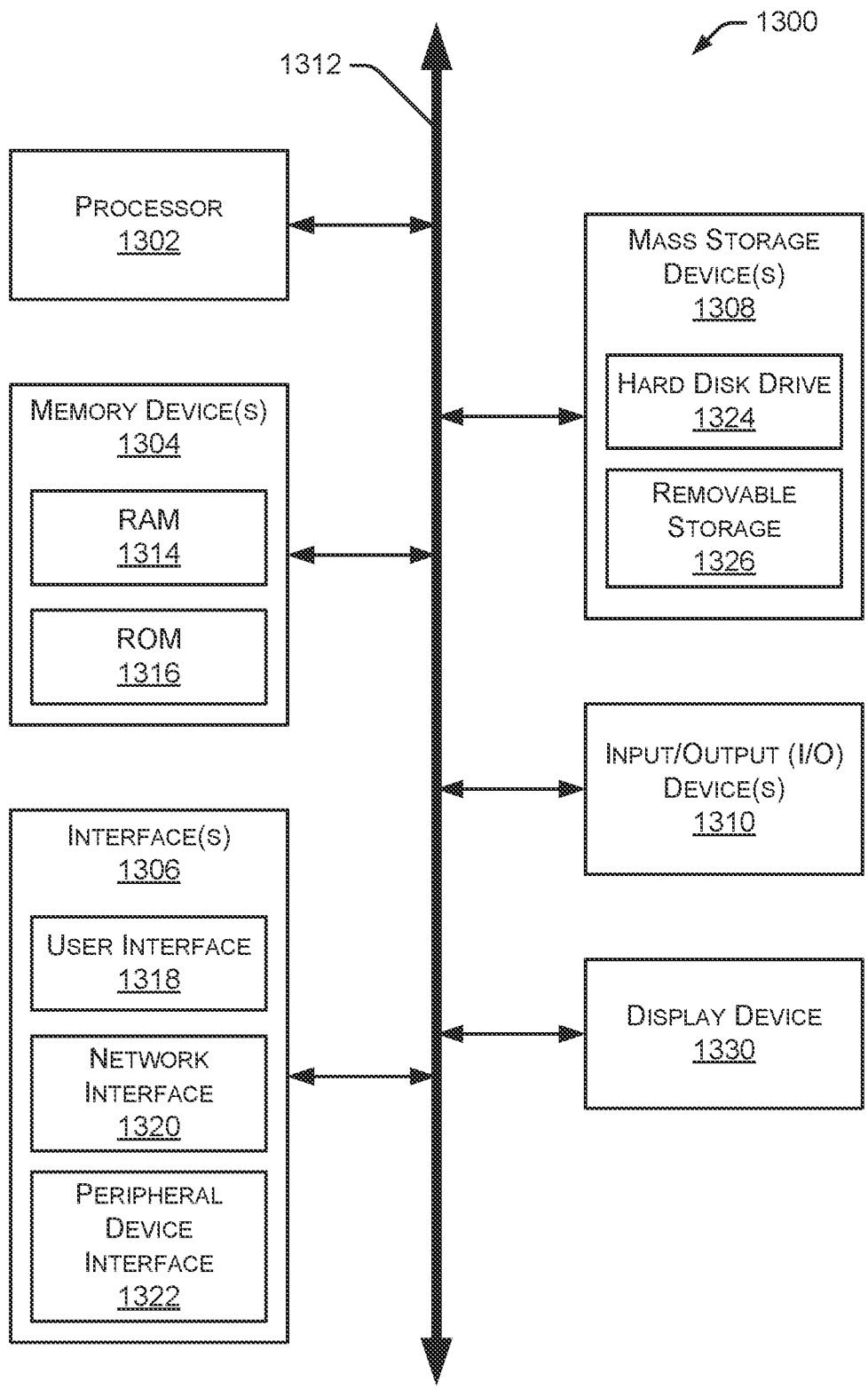
FIG. 13 illustrates an example block diagram of a computing device.

FIG. 13 illustrates an example block diagram of a computing device 1300 suitable for implementing the systems and methods described herein. In some embodiments, a cluster of computing devices interconnected by a network may be used to implement any one or more components of the systems discussed herein.

Computing device 1300 may be used to perform various procedures, such as those discussed herein. Computing device 1300 can function as a server, a client, or any other computing entity. Computing device can perform various functions as discussed herein, and can execute one or more application programs, such as the application programs described herein. Computing device 1300 can be any of a wide variety of computing devices, such as a desktop computer, a notebook computer, a server computer, a handheld computer, tablet computer and the like.

Computing device 1300 includes one or more processor(s) 1302, one or more memory device(s) 1304, one or more interface(s) 1306, one or more mass storage device(s) 1308, one or more Input/Output (I/O) device(s) 1310, and a display device 1330 all of which are coupled to a bus 1312. Processor(s) 1302 include one or more processors or controllers that execute instructions stored in memory device(s) 1304 and/or mass storage device(s) 1308. Processor(s) 1302 may also include various types of computer-readable media, such as cache memory.

Memory device(s) 1304 include various computer-readable media, such as volatile memory (e.g., random access memory (RAM) 1314) and/or nonvolatile memory (e.g., read-only memory (ROM) 1316). Memory device(s) 1304 may also include rewritable ROM, such as Flash memory.

Mass storage device(s) 1308 include various computer readable media, such as magnetic tapes, magnetic disks, optical disks, solid-state memory (e.g., Flash memory), and so forth. As shown in FIG. 13, a particular mass storage device is a hard disk drive 1324. Various drives may also be included in mass storage device(s) 1308 to enable reading from and/or writing to the various computer readable media. Mass storage device(s) 1308 include removable media 1326 and/or non-removable media.

I/O device(s) 1310 include various devices that allow data and/or other information to be input to or retrieved from computing device 1300. Example I/O device(s) 1310 include cursor control devices, keyboards, keypads, microphones, monitors or other display devices, speakers, printers, network interface cards, modems, lenses, CCDs or other image capture devices, and the like.

Display device 1330 includes any type of device capable of displaying information to one or more users of computing device 1300. Examples of display device 1330 include a monitor, display terminal, video projection device, and the like.

Interface(s) 1306 include various interfaces that allow computing device 1300 to interact with other systems, devices, or computing environments. Example interface(s) 1306 include any number of different network interfaces 1320, such as interfaces to local area networks (LANs), wide area networks (WANs), wireless networks, and the Internet. Other interface(s) include user interface 1318 and peripheral device interface 1322. The interface(s) 1306 may also include one or more user interface elements 1318. The interface(s) 1306 may also include one or more peripheral interfaces such as interfaces for printers, pointing devices (mice, track pad, etc.), keyboards, and the like.

Bus 1312 allows processor(s) 1302, memory device(s) 1304, interface(s) 1306, mass storage device(s) 1308, and I/O device(s) 1310 to communicate with one another, as well as other devices or components coupled to bus 1312. Bus 1312 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1300, and are executed by processor(s) 1302. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
   capturing, by a recording device, images and measurements from an inertial measurement unit (IMU);
   generating, by a rendering system, encoded video data based on the captured images and measurements from the IMU, wherein the encoded video data includes at least one region that stores supplemental data, the encoded video including (a) a f-theta regions generated by warping the captured images according to an f-theta model relating two-dimensional pixel coordinates of the captured images to three-dimensional ray directions and (b) an inverse depth map region including an inverse depth map for the captured images;
   storing the encoded video; and
   rendering the encoded video data for viewing by a user proximate a display device.

2. The method of claim 1, wherein the supplemental data includes a background layer of a scene associated with the rendered encoded video data.

3. The method of claim 2, wherein the background layer includes colors and inverse depths of the background layer.

4. The method of claim 2, wherein the background layer includes additional information associated with a particular frame of video being rendered.

5. The method of claim 1, wherein the supplemental data includes a steganography code associated with a particular frame of video being rendered.

6. The method of claim 1, wherein the measurements from the IMU include data associated with a pose of the recording device when each image of the captured images was captured.

7. The method of claim 1, wherein the encoded video data further includes multiple regions that store supplemental data, wherein the supplemental data includes at least one of color image data, a depth map, a background layer, a steganography code, an alpha-channel, or additional channels of data.

8. The method of claim 7, wherein the multiple regions are associated with multiple layers of the captured images.

9. The method of claim 7, wherein the additional channels of data include at least one of surface normals, or smoothness factors.

10. An apparatus comprising:
    one or more processors; and
    one or more non-transitory computer-readable media storing instructions executable by the one or more processors, wherein the instructions, when executed, cause the one or more processors to perform operations comprising:
- capturing images and measurements from a recording device including an inertial measurement unit (IMU);
- generating encoded video data based on the captured images and measurements from the IMU, wherein the encoded video data includes at least one region that stores supplemental data; and
- rendering the encoded video data for viewing by a user proximate a display device, rendering the encoded video data including rectifying the encoded video data according to measurements from the IMU.

11. The apparatus of claim 10, wherein the supplemental data includes color image data from the recording device in f-theta projection.

12. The apparatus of claim 10, wherein the supplemental data includes a background layer of a scene associated with the rendered encoded video data.

13. The apparatus of claim 12, wherein the background layer includes colors and inverse depths of the background layer.

14. The apparatus of claim 10, wherein the supplemental data includes a steganography code associated with a particular frame of video being rendered.

15. The apparatus of claim 10, wherein the measurements from the IMU include data associated with a pose of the recording device when the image was captured.

16. The apparatus of claim 10, wherein the encoded video data further includes multiple regions that store supplemental data, wherein the supplemental data includes at least one of color image data, a depth map, an inverse depth map, a background layer, a steganography code, an alpha-channel, or additional channels of data.

17. One or more non-transitory computer-readable media storing instructions that, when executed, cause one or more processors to perform operations comprising:
- capturing images and measurements from a recording device including an inertial measurement unit (IMU);
- generating encoded video data based on the captured images and measurements from the IMU, wherein the encoded video data includes at least one region that stores supplemental data, and wherein the supplemental data includes color image data from the recording device in f-theta projection; and
- rendering the encoded video data for viewing by a user proximate a display device, rendering the encoded video data including rectifying the encoded video data according to measurements from the IMU.

18. The one or more non-transitory computer-readable media of claim 17, wherein the encoded video data further includes multiple regions that store supplemental data, wherein the supplemental data includes at least one of color image data, a depth map, an inverse depth map, a background layer, a steganography code, an alpha-channel, or additional channels of data.

* * * * *